(12) United States Patent
Cho

(10) Patent No.: US 7,607,585 B2
(45) Date of Patent: Oct. 27, 2009

(54) INTEGRATED CIRCUIT DEVICE WITH MULTIPLE COMMUNICATION MODES AND OPERATING METHOD THEREOF

(75) Inventor: Zang-Hee Cho, Suwon-shi (KR)

(73) Assignee: Samsung Electroncis Co., Ltd., Suwon-Si (KR)

( * ) Notice: Subject to any disclaimer, the term of this patent is extended or adjusted under 35 U.S.C. 154(b) by 1205 days.

(21) Appl. No.: 10/374,796

(22) Filed: Feb. 26, 2003

(65) Prior Publication Data

US 2003/0206547 A1 Nov. 6, 2003

(30) Foreign Application Priority Data

May 3, 2002 (KR) ...................... 10-2002-0024338

(51) Int. Cl.
*G06K 19/06* (2006.01)
*G06K 7/06* (2006.01)

(52) U.S. Cl. ...................... 235/492; 235/441

(58) Field of Classification Search ................ 235/380, 235/492, 441; 439/909; 710/305, 114, 115, 710/105
See application file for complete search history.

(56) References Cited

U.S. PATENT DOCUMENTS

| | | | | |
|---|---|---|---|---|
| 3,752,961 A | * | 8/1973 | Torrey | 235/437 |
| 3,781,482 A | * | 12/1973 | Wisotzky et al. | 379/342 |
| 3,838,321 A | * | 9/1974 | Damm et al. | 318/66 |
| 4,091,366 A | * | 5/1978 | Lavallee | 340/524 |
| 4,257,098 A | * | 3/1981 | Lacy | 714/49 |
| 4,542,865 A | * | 9/1985 | Yamada et al. | 242/333 |
| 4,553,140 A | * | 11/1985 | Maida | 340/636.15 |
| 4,583,682 A | * | 4/1986 | Hernandez | 236/46 R |
| 4,764,893 A | * | 8/1988 | Karabatsos | 710/262 |
| 4,785,394 A | * | 11/1988 | Fischer | 710/114 |
| 5,210,846 A | * | 5/1993 | Lee | 710/115 |
| 5,309,565 A | * | 5/1994 | Hollyer et al. | 710/105 |
| 5,548,790 A | * | 8/1996 | Mayer | 710/35 |
| 5,577,195 A | * | 11/1996 | Gochi | 714/22 |

(Continued)

FOREIGN PATENT DOCUMENTS

CN 1317123 10/2001

(Continued)

OTHER PUBLICATIONS

Abstract from International Application No. WO 00/16255 for corresponding Chinese Publication No. 1317123.

(Continued)

*Primary Examiner*—Thien M. Le
*Assistant Examiner*—Thien T Mai
(74) *Attorney, Agent, or Firm*—F. Chau & Associates, LLC

(57) ABSTRACT

An integrated circuit device having multiple communication modes is provided. The integrated circuit device includes a transceiver coupled to first and second data lines. The integrated circuit device further includes a voltage control circuit. The voltage control circuit determines whether or not an external device is connected to the integrated circuit device. In the case where the external device is connected to the integrated circuit device, the voltage control circuit controls the voltage of the first data line so as to cause the external device to not recognize the integrated circuit device for a predetermined time.

22 Claims, 10 Drawing Sheets

U.S. PATENT DOCUMENTS

| | | | |
|---|---|---|---|
| 5,577,214 A * | 11/1996 | Bhattacharya | 710/107 |
| 5,724,392 A * | 3/1998 | Klimek et al. | 439/955 |
| 5,737,571 A * | 4/1998 | Fukuzumi | 710/13 |
| 5,752,044 A * | 5/1998 | Crump et al. | 710/18 |
| 5,768,629 A * | 6/1998 | Wise et al. | 710/68 |
| 5,847,372 A | 12/1998 | Kreft | |
| 6,087,878 A * | 7/2000 | Suzuki et al. | 327/319 |
| 6,301,628 B1 | 10/2001 | Janssens | |
| 6,414,523 B1 * | 7/2002 | Yoshizaki | 327/112 |
| 6,439,464 B1 * | 8/2002 | Fruhauf et al. | 235/492 |
| 6,477,866 B1 * | 11/2002 | Chamberlin et al. | 68/12.02 |
| 6,581,122 B1 * | 6/2003 | Sarat | 710/301 |
| 6,662,301 B1 * | 12/2003 | Sekine et al. | 713/320 |
| 6,663,570 B2 * | 12/2003 | Mott et al. | 439/909 |
| 6,840,454 B1 | 1/2005 | Rhelimi | |
| 6,883,715 B1 * | 4/2005 | Fruhauf et al. | 235/492 |
| 6,954,815 B2 * | 10/2005 | Kondo | 710/305 |
| 6,996,727 B1 * | 2/2006 | Snyder et al. | 713/300 |
| 2002/0010821 A1 * | 1/2002 | Yu et al. | 710/100 |
| 2002/0040444 A1 * | 4/2002 | Ohie et al. | 713/322 |
| 2002/0066791 A1 * | 6/2002 | Leydier et al. | 235/492 |

FOREIGN PATENT DOCUMENTS

| | | |
|---|---|---|
| CN | 1326573 | 12/2001 |
| EP | 1138226 | 10/2001 |
| EP | 1110173 | 11/2003 |
| WO | WO9949415 | 9/1999 |
| WO | WO00/16255 | 3/2000 |
| WO | WO 00/23936 | 4/2000 |
| WO | WO 02/31762 A1 | 4/2002 |
| WO | WO 0231761 | 4/2002 |

OTHER PUBLICATIONS

Abstract from International Application No. WO 99/49415 for corresponding Chinese Publication No. 1326573.

* cited by examiner

INTEGRATED CIRCUIT DEVICE WITH MULTIPLE COMMUNICATION MODES AND OPERATING METHOD THEREOF

BACKGROUND OF THE INVENTION

1. Field of the Invention

The present invention relates to integrated circuit devices, and more particularly, to an integrated circuit device with serial bus communication modes.

2. Discussion of the Related Art

As is well known, a smart card interfaces with a smart card reader on the basis of International Standardization Organization (ISO) 7816 standard (hereinafter, referred to as ISO-7816 standard). The smart card provides eight pins. Specifically, the smart card includes a power supply voltage terminal (VDD), a ground voltage terminal (VSS), a reset terminal (RST), a clock terminal (CLK), an input/output terminal (SIO), a high-voltage terminal (VPP) and two reserved terminals.

The smart card as an integrated circuit device has been developed to be operable in other serial bus communication modes, as well as an ISO-7816 communication mode.

For example, the serial bus communication mode may be a universal serial bus communication mode (hereinafter, referred to as USB communication mode). In the case of such a smart card, the reserved terminals will be used to transmit a data in the USB communication mode. Accordingly, the smart card may operate in the ISO-7816 communication mode (hereinafter, referred to as ISO communication mode) or the USB communication mode so as to interface with an external device (e.g., a smart card reader).

Although the smart card supports both the ISO and USB communication modes, the smart card must operate in either the ISO communication mode or the USB communication mode according to the communication mode supported by the external device. This means that the communication mode of the conventional smart card must be fixed to any one of the communication modes. Consequently, the smart card cannot use one of the ISO and USB communication modes.

SUMMARY OF THE INVENTION

An integrated circuit device capable of operating in all of multiple communication modes is provided. The integrated circuit device recognizes a connection state of an external device prior to recognizing the external device, in the case where the external device is connected thereto.

An integrated circuit device in accordance with an embodiment of the present invention has multiple communication modes and includes first and second data lines and a transceiver circuit coupled to the first and second data lines. A voltage control circuit determines whether or not an external device is connected to the integrated circuit device and controls a voltage of the first data line according to the determination result. In the case where the external device is connected to the integrated circuit device, the voltage control circuit controls the voltage of the first data line so as to cause the external device to not recognize the integrated circuit device for a predetermined time.

According to another aspect of the present invention, the integrated circuit device is set to any one of the communication modes according to the determination result.

In another aspect of the present invention, the voltage control circuit controls the voltage of the first data line so as to cause the external device to recognize the integrated circuit device after the predetermined time after the integrated circuit device is connected thereto.

In a further aspect of the present invention, the voltage control circuit controls the voltage of the first data line to be lower than a predetermined reference voltage for the predetermined time, so that the external device does not recognize the integrated circuit device.

According to yet another of the present invention, the voltage control circuit increases the voltage of the first data line after the predetermined time so as to cause the external device to recognize the integrated circuit device as a low or high speed device.

In another aspect of the present invention, the voltage control circuit controls a voltage of the second data line to be equal to that of the first data line for the predetermined time, the voltage of the second data line being determined by the external device after the predetermined time.

According to a further aspect of the present invention, the multiple communication modes include an ISO communication mode and a non-ISO communication mode.

In another aspect of the present invention, the integrated circuit device includes a smart card supporting the ISO communication mode and the non-ISO communication mode, and the external device includes a smart card reader.

BRIEF DESCRIPTION OF THE DRAWINGS

The forgoing and other aspects, features and advantages of the present invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Hereinafter, preferred embodiments of the present invention will be described in detail with reference to the accompanying drawings.

Figure 1:
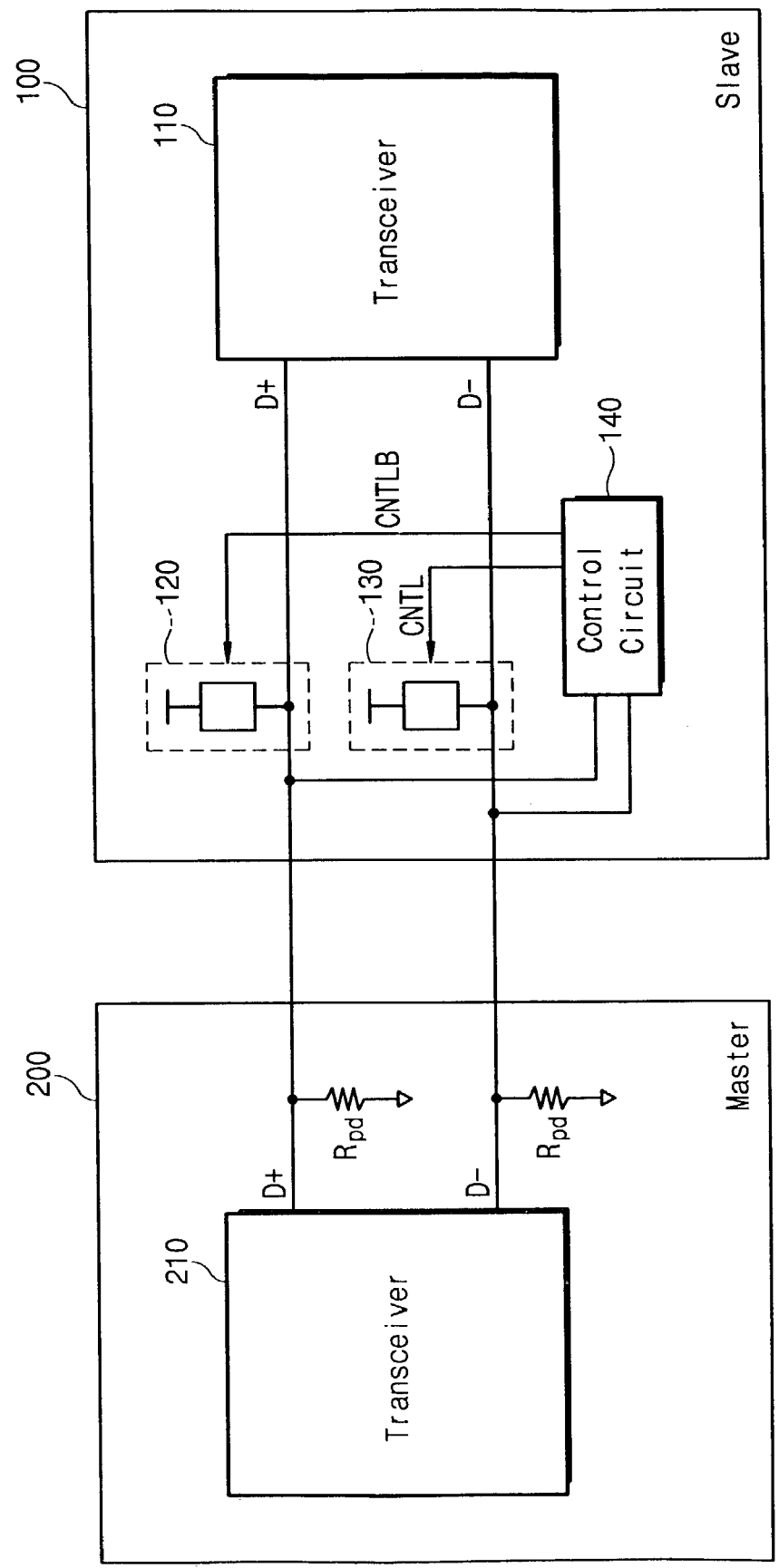
FIG. 1 is a block diagram of an integrated circuit device in accordance with a first embodiment of the present invention.

FIG. 1 is a block diagram of an integrated circuit device 100 in accordance with a first embodiment of the present invention.

Referring to FIG. 1, the integrated circuit device 100 is a slave device and communicates with a master device 200 on the basis of any one of multiple communication modes. At this time, the multiple communication modes include an ISO communication mode and a non-ISO communication mode. In this embodiment, the non-ISO communication mode includes a USB communication mode. Meanwhile, it is apparent that the non-ISO communication mode further includes other communication modes. The integrated circuit device 100 includes data lines (or data terminals) D+ and D− for transmitting/receiving data to/from the master device 200. A slave transceiver 110 for receiving and transmitting the data via the data lines D+ and D− is connected to the data lines D+ and D−.

In addition, first and second pull-up circuits 120 and 130 are connected to the data lines D+ and D−, respectively. A control circuit 140 is connected to the data lines D+ and D−. The control circuit 140 detects whether or not voltages of the data lines D+ and D− are lower than a predetermined reference voltage (e.g., 1 V). The control circuit 140 controls the first and second pull-up circuits 120 and 130 according to the detection result. A detailed explanation of the control circuit 140 will be given below. The master device 200 includes a master transceiver 210 connected to the data lines D+ and D−. Pull-down resistors Rpd are connected to the data lines D+ and D− of the master device 200, respectively.

When the integrated circuit device 100 of the present invention is electrically connected to the master device 200, the master device 200 applies a power supply voltage to the integrated circuit device 100 and controls the integrated circuit device 100. To control the integrated circuit device 100 as the slave device, the master device 200 detects whether or not the slave device 100 is connected thereto and then communicates with the slave device 100 according to the detection result. The master device 200 recognizes whether or not the slave device 100 is connected to the master device 200 in response to the voltages of the data lines D+ and D−. By controlling the voltages of the data lines D+ and D−, the slave device 100 of the present invention can cause the master device 200 either to recognize or to not recognize the slave device 100 itself. A detailed explanation about that will be given below.

In this embodiment of the present invention, the integrated circuit device 100 is a universal serial bus device (hereinafter, referred to as a "USB device") and the master device 200 is a universal serial bus hub (hereinafter, referred to as a "USB hub"). The USB device is also called "function".

When the USB hub 200 is connected to the USB device 100, the control circuit 140, shown in FIG. 1, controls the first and second pull-up circuits 120 and 130 so that the USB hub 200 cannot recognize the connection state of the USB device 100. For example, the control circuit 140 controls the first and second pull-up circuits 120 and 130 to have the same resistance when the USB hub 200 is connected to the USB device 100.

In other words, even when the USB hub 200 is connected to the USB device 100, the data lines D+ and D− maintain the same voltage. After a predetermined time has elapsed from a point of time when the USB hub 200 is connected to the USB device 100, the control circuit 140 controls the first and second pull-up circuits 120 and 130 to cause the USB hub 200 to recognize the connection state of the USB device 100. For example, the control circuit 140 varies the resistance of one of the first 120 and second pull-up circuits 130 and simultaneously isolates electrically the other pull-up circuit 130 or 120 from the corresponding data line.

In the integrated circuit device of the present invention, the first and second pull-up circuits 120 and 130 and the control circuit 140 constitute a voltage control circuit. When the USB device 100 is connected to the USB hub 200, the voltage control circuit controls the voltages of the data lines D+ and D− so that the USB hub 200 cannot recognize the USB device 100 for a predetermined time.

Figure 2:
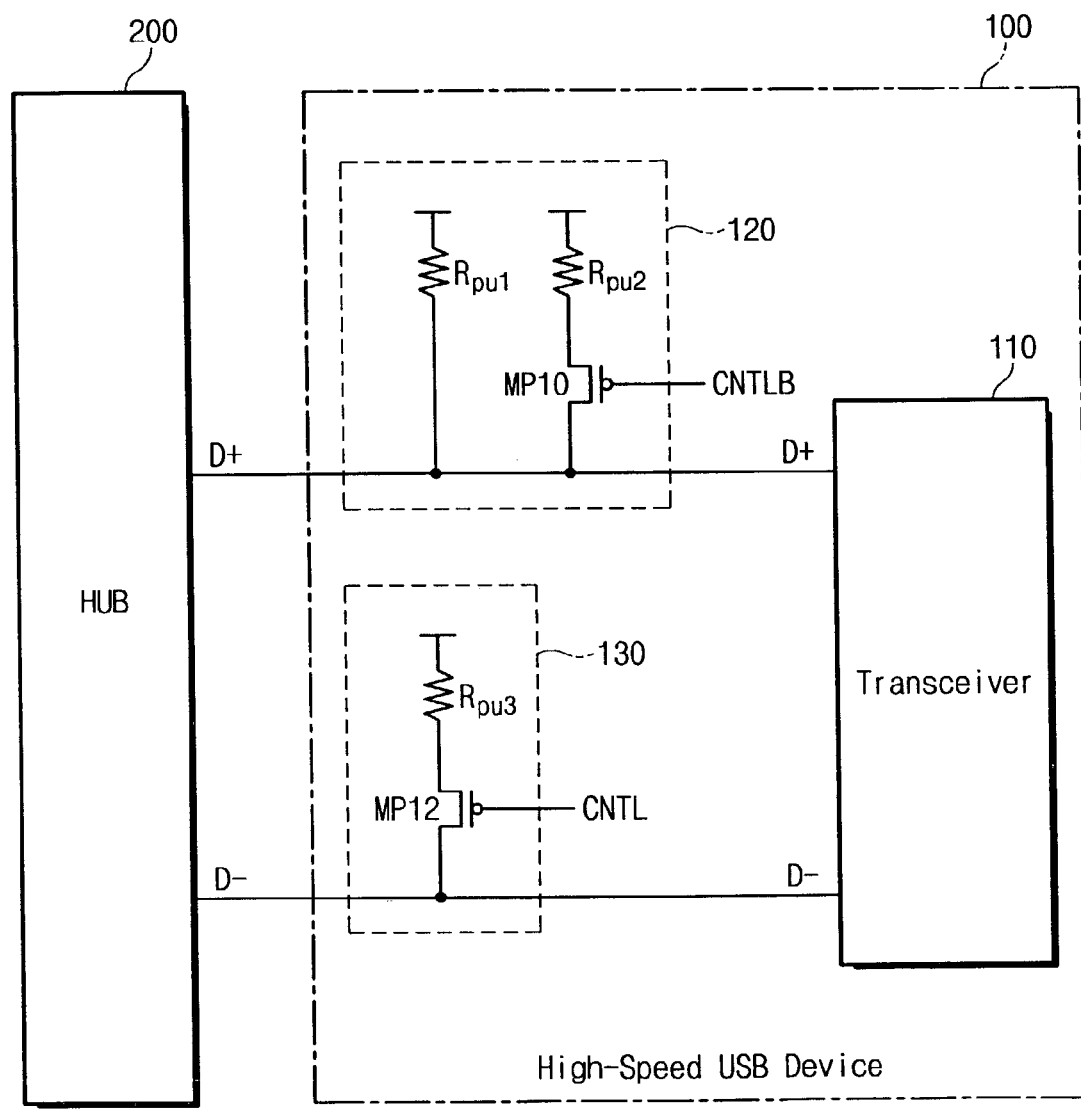
FIG. 2 is a schematic diagram showing a preferred embodiment of the pull-up circuits shown in FIG. 1.

FIG. 2 is a schematic diagram showing a preferred embodiment of the pull-up circuits 120 and 130 in accordance with the present invention. Referring to FIG. 2, the first pull-up circuit 120 includes two pull-up resistors Rpu1 and Rpu2 and a PMOS transistor MP10. The pull-up resistor Rpu1 is connected between a power supply voltage and the data line D+. The pull-up resistor Rpu2 is connected between the power supply voltage and a source of the PMOS transistor MP10. The PMOS transistor MP10 has a drain coupled to the data line D+ and a gate connected to a control signal CNTLB. The second pull-up circuit 130 includes a pull-up resistor Rpu3 and a PMOS transistor MP12. One terminal of the pull-up resistor Rpu3 is connected to the power supply voltage. The PMOS transistor MP12 is connected between the other terminal of the pull-up resistor Rpu3 and the data line D−. The PMOS transistor MP12 is turned on/off in response to a control signal CNTL.

At this time, the pull-up resistors Rpu1 and Rpu3 have the same resistance and the pull-up resistor Rpu2 has a smaller resistance than the pull-up resistors Rpu1 and Rpu3. For example, the pull-up resistors Rpu1 and Rpu3 have resistances of 150 KΩ, respectively, and the pull-up resistor Rpu2 has a resistance of 1.5 KΩ. The control signals CNTL and CNTLB are complementary signals and are generated from the control circuit 140 shown in FIG. 1. When the power is on or the USB device 100 is connected to the USB hub 200, the control circuit 140 generates the control signal CNTL of a low level and the control signal CNTLB of a high level. Therefore, the PMOS transistor MP10 of the first pull-up circuit 120 is turned off and the PMOS transistor MP12 of the second pull-up circuit 130 is turned on.

An operation of the integrated circuit device in accordance with the present invention will be described below in detail with reference to FIGS. 1 and 2. First, when the USB device 100 is not electrically connected to the USB hub 200 or the power is off, the power supply voltage is not applied to the USB device 100. Then, in the case where the USB device 100 is electrically connected to the USB hub 200 and the USB hub 200 applies the power supply voltage to the USB device 100, the control circuit 140 generates the control signal CNTL of the low level and the control signal CNTLB of the high level in response to a supply of the power supply voltage. While the PMOS transistor MP10 of the first pull-up circuit 120 is turned off in response to the control signal CNTLB of the high level, the PMOS transistor MP12 of the second pull-up circuit 130 is turned on in response to the control signal CNTL of the low level. Consequently, the pull-up resistors Rpu1 and Rpu3 having the same resistance are connected to the data lines D+ and D−, respectively.

While the pull-up resistors Rpu1 and Rpu3 having the same resistance are connected to the data lines D+ and D−, respectively, the USB hub 200 does not recognize that the USB device 100 is connected thereto. To cause the USB hub 200 to recognize the USB device's connection, as is well known, the voltage of either of the data lines D+ and D− must be increased. For example, if the USB device 100 is a high-speed USB device, the voltage of the data line D+ is increased with the connection of the USB device 100 to the USB hub 200.

With the increase in the voltage of the data line D+, the USB hub 200 recognizes that the USB device 100 is the high-speed USB device. Meanwhile, if the USB device 100 is a low-speed USB device, the voltage of the data line D− is increased. With the increase in the voltage of the data line D−, the USB hub 200 recognizes that the USB device 100 is the low-speed USB device.

Figure 3A:
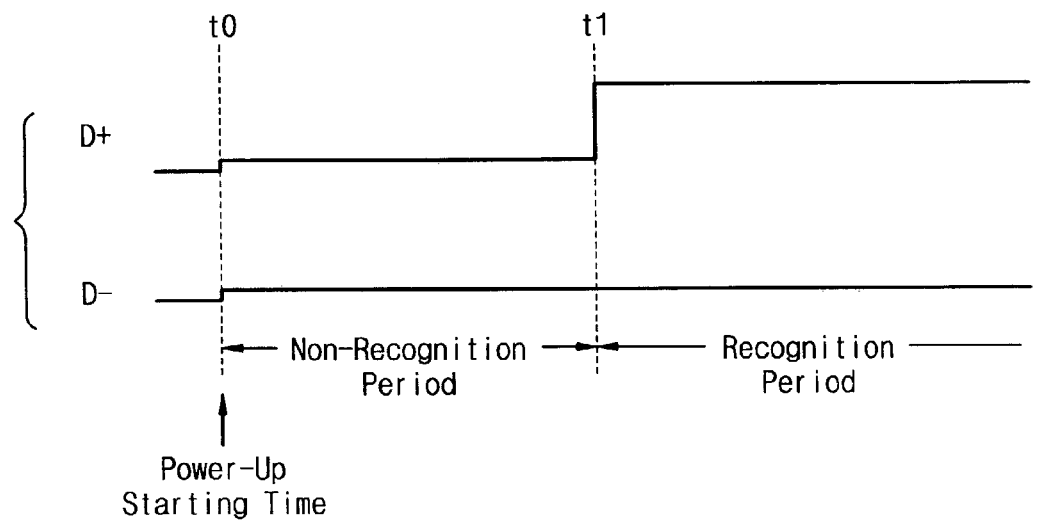
FIG. 3a is a diagram showing a voltage change of the data lines when the integrated circuit device is electrically connected to an external device.

As shown in FIG. 1, the data lines D+ and D− of the USB hub 200 applying the power supply voltage are connected to the ground voltage via the pull-down resistors Rpd having resistances of about 15 KΩ. The pull-up resistors Rpu1 and Rpu3 having large resistances are connected to the data lines D+ and D−. Therefore, the voltages of the data lines D+ and D− are almost not changed (refer to FIG. 3a). For example, in case of the power supply voltage of 3.3 V, the pull-up resistors Rpu1 and Rpu3 of 150 KΩ and the pull-down resistors Rpd of 15 KΩ, the data lines D+ and D− have the voltages of about 0.3 V, respectively. The control circuit 140 detects whether or not the voltages of the data lines D+ and D− are lower than a predetermined reference voltage (e.g., 1 V). If so, the resistance of the first pull-up circuit 120 is varied and simultaneously the second pull-up circuit 130 is electrically isolated from the corresponding data line. A detailed explanation will be given below. If the voltages of the data lines D+ and D− are lower than the predetermined reference voltage (e.g., 1 V), the control circuit 140 generates the control signal CNTLB of the low level and the control signal CNTL of the high level. The PMOS transistor MP10 of the first pull-up circuit 120 is turned on in response to the control signal CNTLB of the low level. As a result, the pull-up resistors Rpu1 and Rpu2 are simultaneously connected to the data line D+. At this time, a total resistance of the pull-up resistors Rpu1 and Rpu2 is about 1.5 KΩ and the voltage of the data line D+ is increased compared with a previous voltage thereof. At the same time, the PMOS transistor MP12 of the second pull-up circuit 130 is turned off in response to the control signal CNTL of the high level. As a result, the second pull-up circuit 130 is electrically isolated from the data line D−. At this time, the voltage of the data line D− is determined by the USB hub 200. Then, the USB hub 200 detects the voltage change of the data line D+ and recognizes the USB device 100 as the high-speed USB device.

Figure 3B:
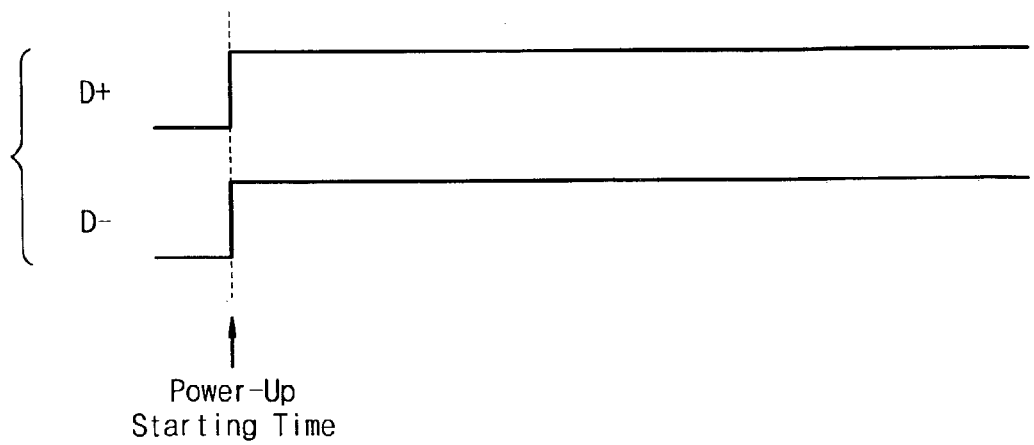
FIG. 3b is a diagram showing a voltage change of the data lines when the integrated circuit device is not electrically connected to an external device.

As shown in FIG. 3b, in the case where the voltages of the data lines D+ and D are higher than the reference voltage, the USB device 100 operates in a non-USB communication mode (e.g., an ISO communication mode). In other words, although the power supply voltage is applied to the USB device 100, the USB device 100 recognizes that the USB device 100 itself is not connected to the USB hub 200, and operates in other communication modes (e.g., an ISO communication mode). Thereafter, the integrated circuit device 100 operates based on a selected communication mode.

According to the integrated circuit device of the present invention, in the case where the integrated circuit device 100 is the low-speed USB device, the first pull-up circuit 120 is connected to the data line D− and the second pull-up circuit 130 is connected to the data line D+. Except for this, the integrated circuit device 100 operates in the same method as the high-speed USB device. Thus, an explanation of the low-speed USB device will be omitted.

Figure 4:
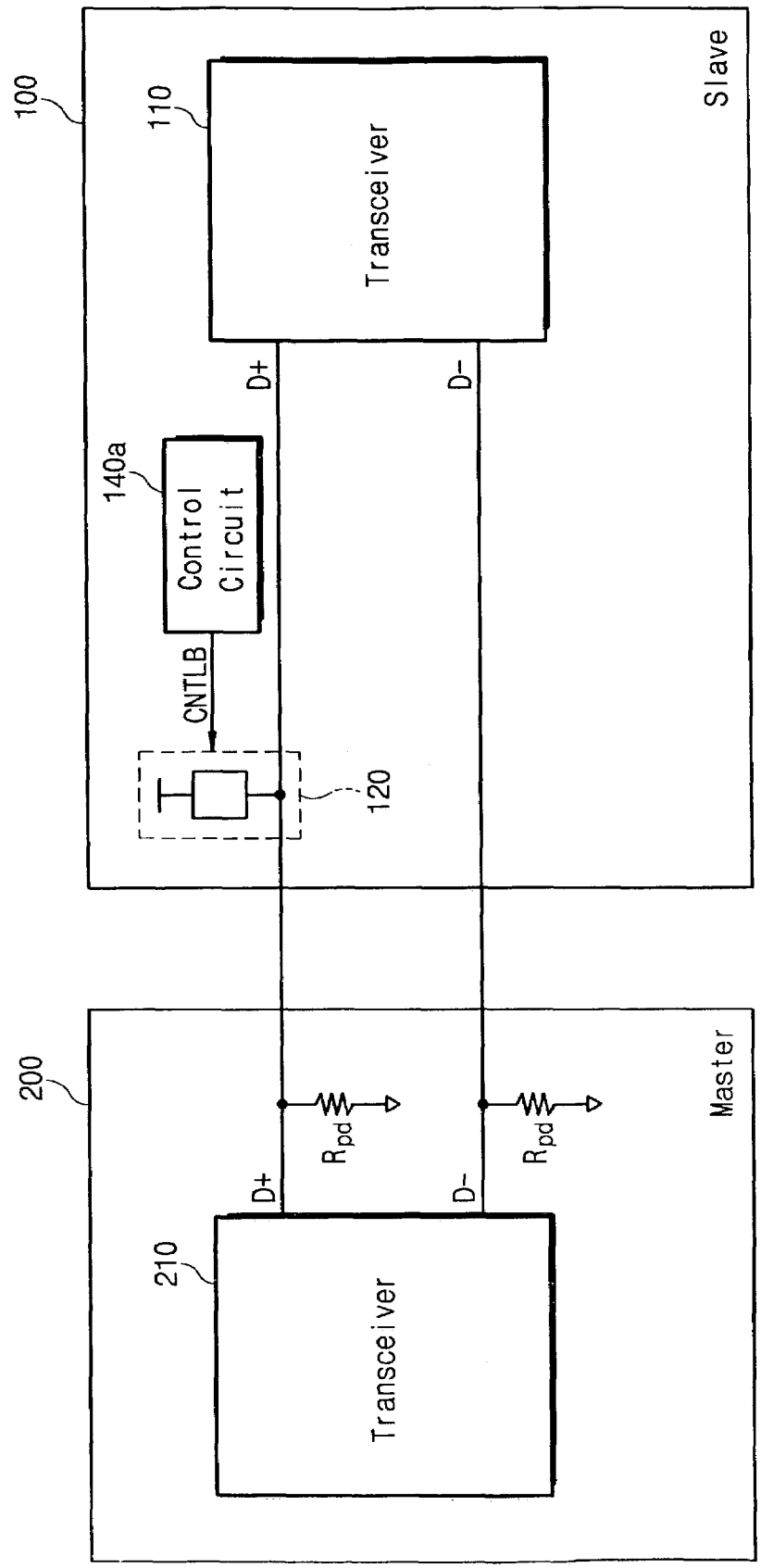
FIG. 4 is a block diagram of an integrated circuit device in accordance with a second embodiment of the present invention.
Figure 5A:
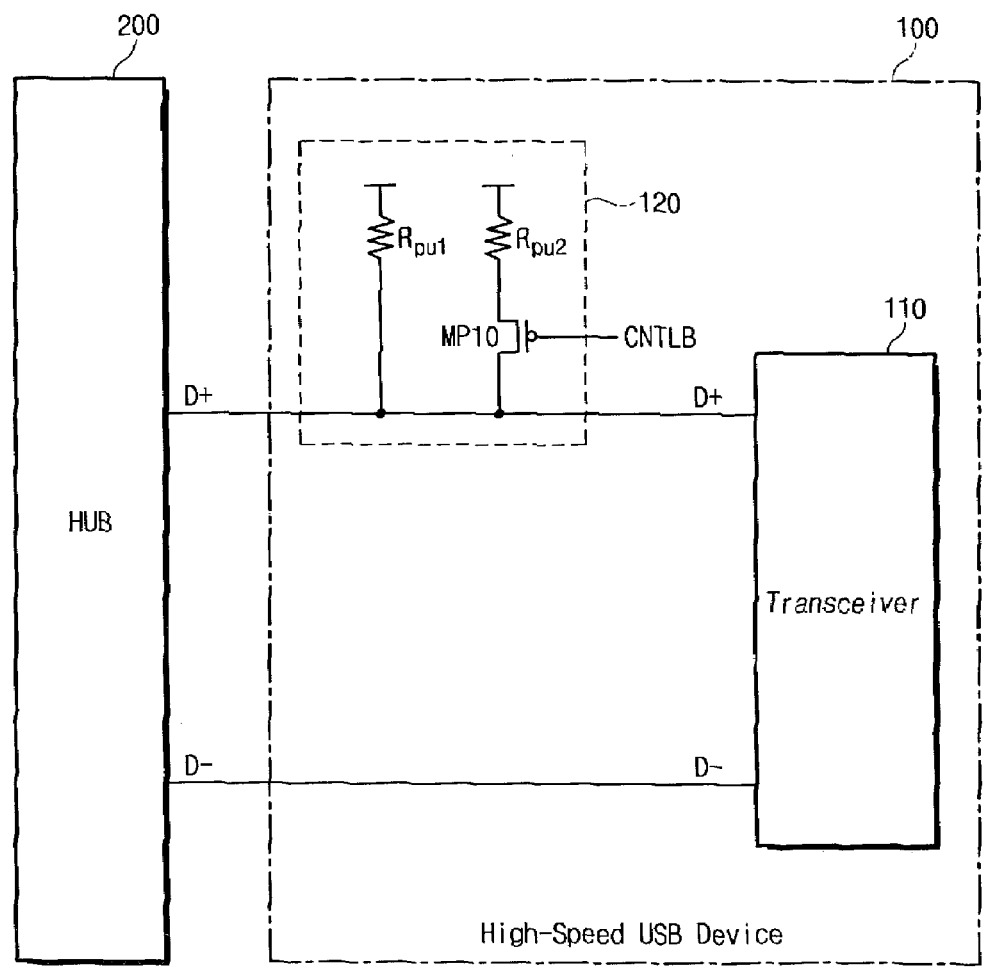
FIGS. 5a and 5b are schematic diagrams showing preferred embodiments of the pull-up circuit shown in FIG. 4.
Figure 5B:
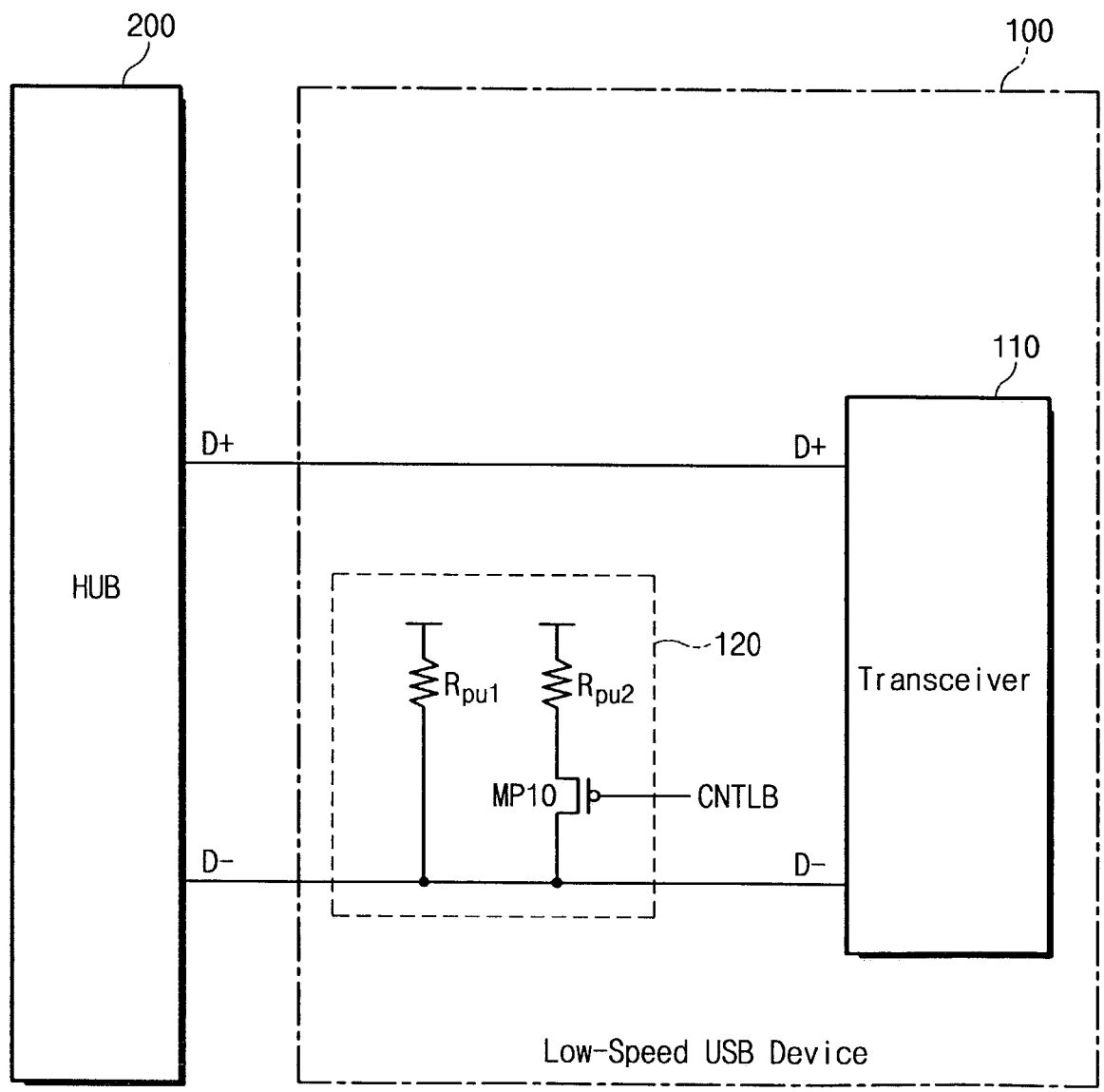

FIG. 4 is a block diagram of an integrated circuit device in accordance with a second embodiment of the present invention, and FIGS. 5a and 5b are schematic diagrams of preferred embodiments of the pull-up circuit shown in FIG. 4. The second embodiment of the present invention is the same as the above-described first embodiment except that the second pull-up circuit 130 is eliminated. In the case where a USB device 100 as a slave device is a high-speed USB device, a pull-up circuit 120 and a control circuit 140a are connected to a data line D+. As shown in FIG. 5a, the pull-up circuit 120 includes two pull-up resistors Rpu1 and Rpu2 and a PMOS transistor MP10. On the contrary, as shown in FIG. 5b, in the case where the USB device 100 as the slave device is a low-speed USB device, the pull-up circuit 120 and the control circuit 140a are connected to a data line D−.

An operation of the integrated circuit device 100 according to the second embodiment of the present invention is similar to that of the above-described first embodiment and thus a detailed description about that will be omitted. It is apparent to those skilled in the art that the integrated circuit device 100 of the second embodiment can obtain the same advantages as that of the first embodiment.

Figure 6:
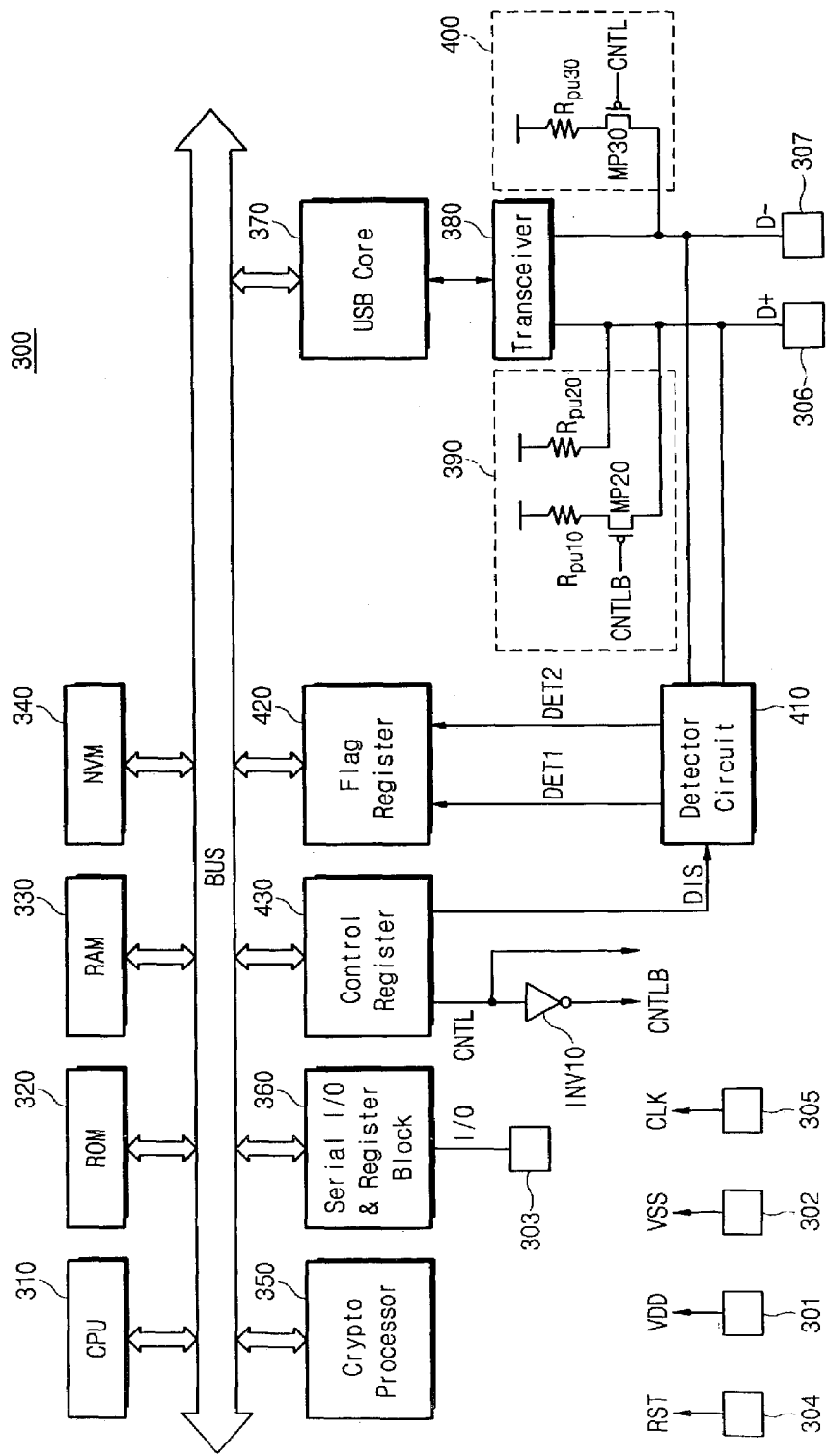
FIG. 6 is a block diagram of a smart card as an example of the integrated circuit device in accordance with the first embodiment of the present invention.

FIG. 6 is a block diagram of a smart card 300 as an example of the integrated circuit device in accordance with the first embodiment of the present invention. Referring to FIG. 6, the smart card 300 has multiple communication modes. For example, the smart card 300 includes an ISO communication mode and a non-ISO communication mode. The non-ISO communication mode includes a USB communication mode as a serial bus communication mode. The smart card 300 has seven terminals, e.g., VDD terminal 301, VSS terminal 302, I/O terminal 303, RST terminal 304, CLK terminal 305, D+ and D− data terminals 306 and 307, and one reserved terminal (not shown). Additionally, the smart card 300 includes a CPU 310, a ROM 320, a RAM 330, an NVM 340, a crypto processor 350, and a serial I/O control and register block 360. The smart card 300 receives power supply voltage and ground voltage, which are supplied from an external device (e.g., a smart card reader), and operates in synchronization with the clock signal CLK. The CPU 310 controls a whole operation of the smart card 300, and the ROM 320 and the NVM 340 are nonvolatile memory devices and store various programs for the operation of the smart card 300. In the ISO communication mode, the data is inputted/outputted via the serial I/O control and register block 360 based on the control of the CPU 310.

As shown in FIG. 6, the smart card 300 further includes a USB core 370, a USB transceiver 380, first and second pull-up circuits 390 and 400, a detector circuit 410, a flag register 420, a control register 430 and an inverter INV10.

The USB transceiver 380 is connected between the data terminals D+ and D− and inputs/outputs the data from/to an exterior of the smart card 300 according to a control of the USB core 370. The first and second pull-up circuits 390 and 400 are connected to the data lines D+ and D−, respectively. The first pull-up circuit 390 includes two pull-up resistors Rpu10 and Rpu20 and a PMOS transistor MP20. The pull-up resistor Rpu10 is connected between the power supply voltage and a source of the PMOS transistor MP20. The pull-up resistor Rpu20 is connected between the power supply voltage and the data line D+. The PMOS transistor MP20 has a drain coupled to the data line D+ and a gate coupled to a control signal CNTLB. The second pull-up circuit 400 includes a pull-up resistor Rpu30 and a PMOS transistor MP30. One terminal of the pull-up resistor Rpu30 is connected to the power supply voltage. The PMOS transistor MP30 is connected between the other terminal of the pull-up resistor Rpu30 and the data line D− and is turned on/off in response to a control signal CNTL.

The detector circuit 410 is connected to the data lines D+ and D− or the data terminals 306 and 307. The detector circuit 410 detects whether or not the voltages of the data lines D+ and D− are lower than a reference voltage. The detector circuit 410 generates first and second detection signals DET1 and DET2 as the detection result. The flag register 420 is a data that represents whether or not the smart card 300 is connected to an external device, and stores the first and second detection signals DET1 and DET2. The CPU 310 reads the data stored in the flag register 420 and generates a control data that represents whether or not the external device as the USB hub is connected to the data lines D+ and D−. The control data is stored in the control register 430. The control register 430 generates the control signal CNTL of a low level or a high level in response to the control data generated by the CPU 310. The control register 430 generates a control signal DIS in response to the control data and the detector circuit 410 is disabled in response to the control signal DIS.

Figure 7:
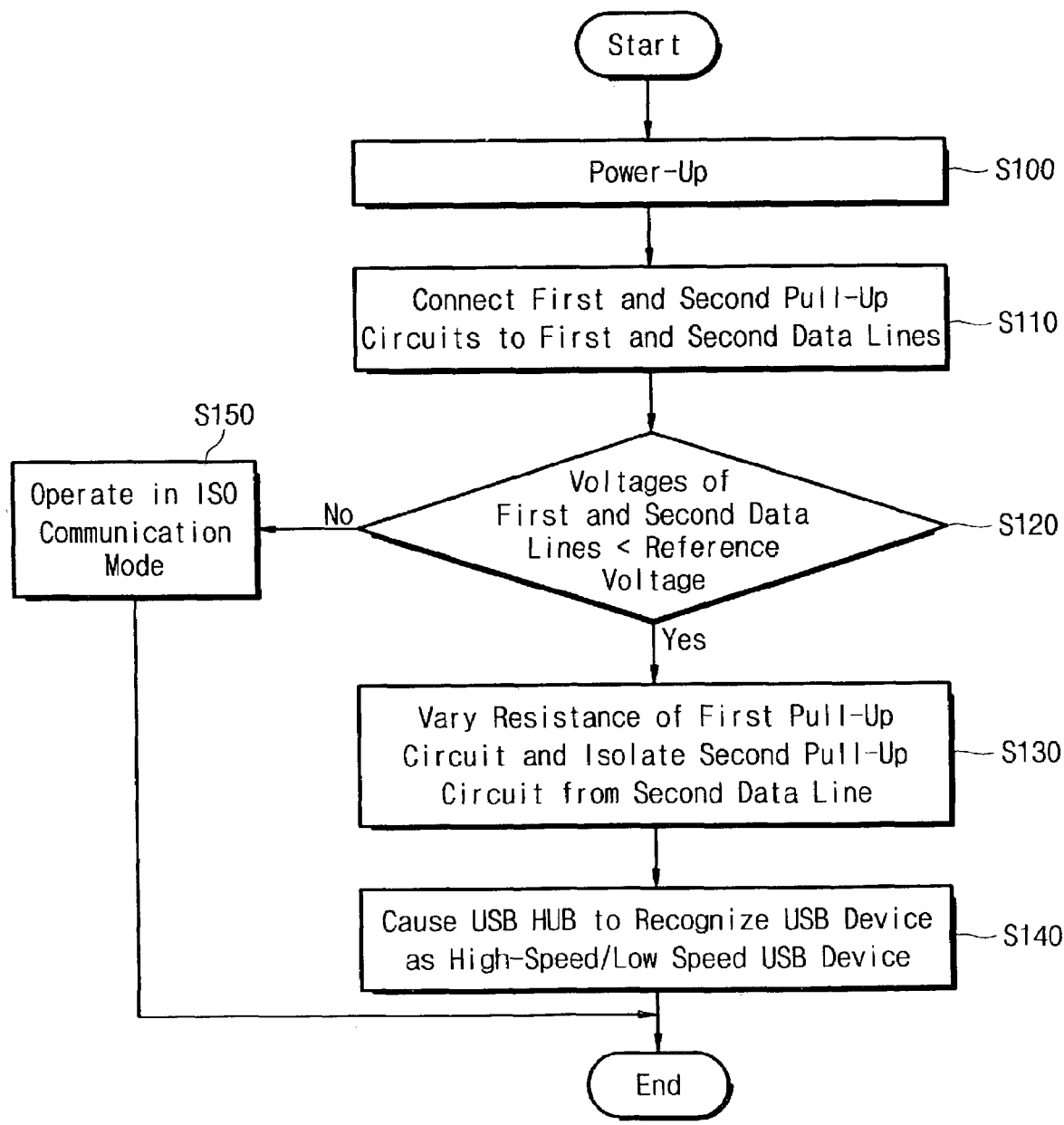
FIG. 7 is a flowchart explaining an operation of the smart card shown in FIG. 6.

FIG. 7 is a flowchart explaining an operation of the smart card shown in FIG. 6. The operation of the smart card in accordance with the present invention will be described below in detail with reference to FIGS. 6 and 7.

In step S100, if an external device (e.g., a smart card reader) is not electrically connected to the smart card 300, the power supply voltage is not applied to the smart card 300. If the smart card 300 is electrically connected to the smart card reader as the external device, the power supply voltage is applied to the smart card 300. In step S110, as described above, the control register 430 is initialized according to the applying of the power supply voltage, and thus the control signal CNTLB of the high level and the control signal CNTL of the low level are applied to the PMOS transistor MP20 and the PMOS transistor MP30, respectively. As a result, the pull-up circuits having the same resistance (more specifically, the pull-up resistors Rpu10 and Rpu30) are connected to the data lines D+ and D−, respectively.

While the pull-up resistors Rpu10 and Rpu30 having the same resistance are connected to the data lines D+ and D−, the smart card reader as the USB hub does not recognize that the smart card 300 as the USB device is connected thereto. As described above, to cause the smart card reader to recognize the smart card's connection, the voltage of either of the data lines D+ and D− must be increased. USB data lines (not shown) of the smart card reader applying the power supply voltage are connected to the ground voltage via the pull-down resistors (refer to FIG. 1) having the resistance of about 15 KΩ. Therefore, even when the pull-up resistors Rpu10 and Rpu30 are connected to the data lines D+ and D− of the smart card 300, respectively, the voltages of the data lines D+ and D− are almost not changed (refer to FIG. 3a).

In step S120, the detector circuit 410 detects whether or not the voltages of the data lines D+ and D− are lower than the predetermined reference voltage (e.g., 1 V). In step S130, if so, the resistance of the first pull-up circuit 390 is varied and simultaneously the second pull-up circuit 400 is electrically isolated from the corresponding data line. A more detailed explanation will be given below.

If the voltages of the data lines D+ and D− are lower than the predetermined reference voltage (e.g., 1 V), the flag register 420 receives the detection signals DET1 and DET2 as data representing that the external device is connected to the smart card 300. Then, the CPU 310 reads the data, which is stored in the flag register 420, according to a predetermined program stored in the ROM 320, and generates the control data that represents whether or not the external device as the USB device is connected to the data lines D+ and D−. The control data is stored in the control register 430. The control register 430 generates the control signal CNTL in response to the control data generated by the CPU 310. For example, when the control data represents that the external device is connected to the data lines D+ and D−, the control register 430 generates the control signal CNTL of the high level.

The PMOS transistor MP20 of the first pull-up circuit 390 is turned on in response to the control signal CNTLB of the low level. As a result, the pull-up resistors Rpu10 and Rpu20 are simultaneously connected to the data line D+. At this time, a total resistance of the pull-up resistors Rpu10 and Rpu20 is about 1.5 KΩ and the voltage of the data line D+ is increased compared with a previous voltage thereof. At the same time, the PMOS transistor MP30 of the second pull-up circuit 400 is turned off in response to the control signal CNTL of the high level. As a result, the second pull-up circuit 400 is electrically isolated from the data line D−. At this time, the voltage of the data line D− is determined by the external device. Accordingly, as described above, if the voltages of the data lines D+ and D− are lower than the predetermined voltage (e.g., 1 V), the resistance of the first pull-up circuit 390 is varied and simultaneously the second pull-up circuit 400 is electrically isolated from the corresponding data line.

Then, in step S140, the external device as the USB hub recognizes the smart card 300 as the high-speed USB device by detecting the voltage change of the data line D+. In step S150, if the voltages of the data lines D+ and D− are higher than the reference voltage, the smart card 300 operates in the non-USB communication mode (e.g., the ISO communication mode). In other words, although the power supply voltage is applied to the smart card 300, the smart card 300 recognizes that it does not operate in the USB communication mode, and operates in other communication modes (e.g., the ISO communication mode). Then, the smart card 300 will operate based on a selected communication mode.

Figure 8A:
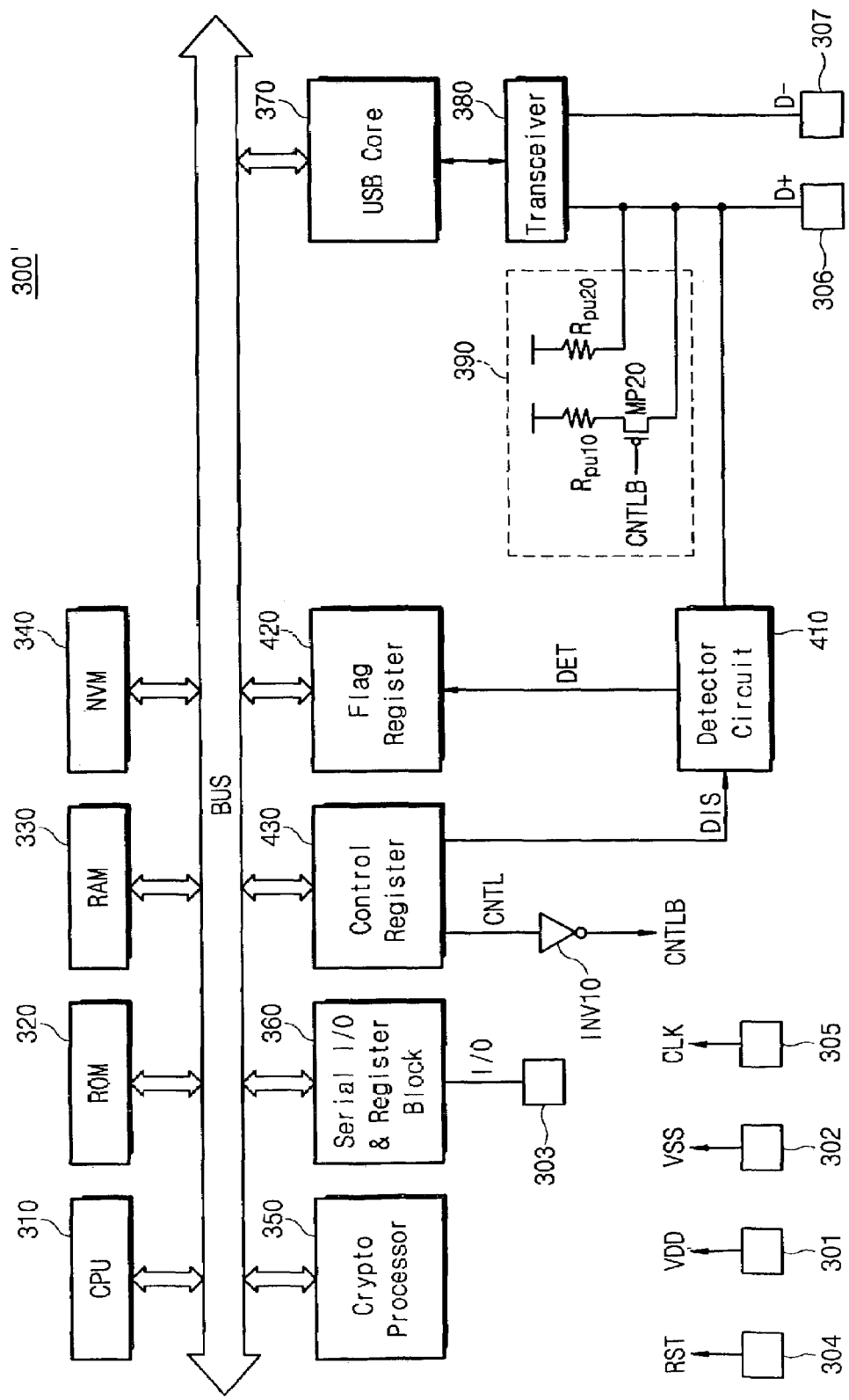
FIGS. 8a and 8b are block diagrams of a smart card as an example of the integrated circuit device in accordance with the second embodiment of the present invention.
Figure 8B:
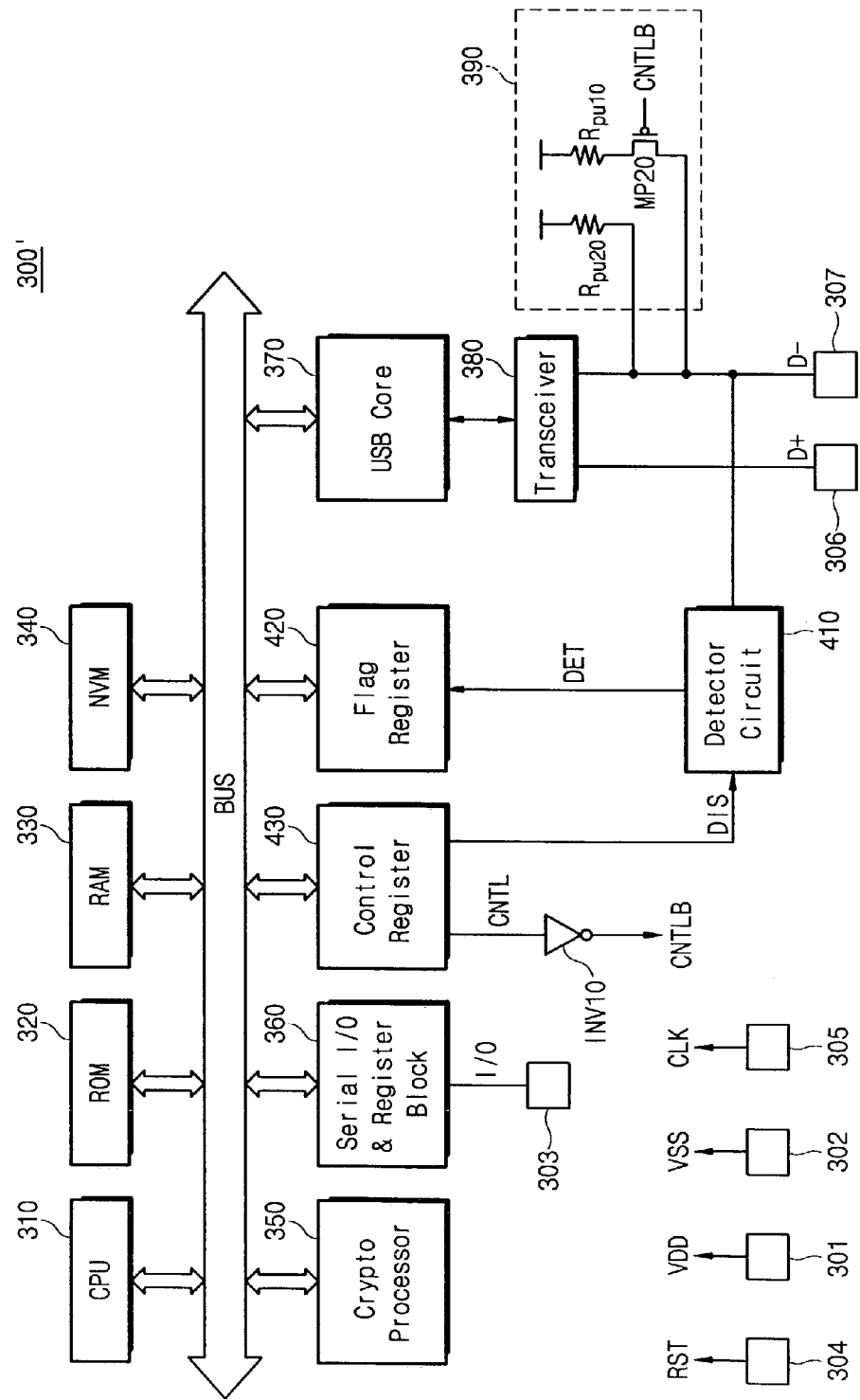

FIGS. 8a and 8b are block diagrams of a smart card as an example of an integrated circuit device in accordance with a second embodiment of the present invention. Referring to FIG. 8a, the smart card 300' is the same as the smart card 300 shown in FIG. 6 except that the second pull-up circuit 400 is eliminated. Thus, a detailed description about that will be omitted. As can be seen from FIG. 8a, in the case where the smart card 300' as the slave device is the high-speed USB device, the pull-up circuit 390 and the detector circuit 410 are connected to the data line D+. On the contrary, as shown in FIG. 8b, in case where the smart card 300' as the slave device is the low-speed USB device, the pull-up circuit 390 and the detector circuit 410 are connected to the data line D−.

As described above, when the slave device is connected to the master device, the slave device recognizes the master device and then performs a necessary operation (e.g., an operation of setting the communication mode). Thereafter, the master device recognizes the slave device. In the case where the slave device supports multiple communication modes, the integrated circuit device as the slave device in accordance with the present invention is not fixed to a specific communication mode. For these reasons, other communication modes can be also used in the integrated circuit device. For example, in the case where the integrated circuit device is a smart card that supports the ISO communication mode and the USB communication mode, the smart card can be used in a smart card reader supporting the ISO communication mode, a smart card reader supporting the USB communication mode, and a smart card reader supporting both the ISO and USB communication modes.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An integrated circuit device having an ISO communication mode and a non-ISO communication mode, the integrated circuit device comprising:
   a plurality of data lines comprising a first data line and a second data line;
   a transceiver circuit coupled to the plurality of data lines; and
   a means for determining whether or not the integrated circuit device is electrically connected to an external device in response to a voltage level signal on at least one data line at a power-up state;
   wherein the integrated circuit device is set to any one of the ISO communication mode and the non-ISO communication mode within a predetermined time according to the voltage level and the integrated circuit device causes the external device not to recognize a connection state of the integrated circuit device for the predetermined time, and after the predetermined time, the integrated circuit device causes the external device to recognize the connection state;
   wherein the voltage control circuit controls a voltage of the second data line to be equal to that of the first data line for the predetermined time, the voltage of the second data line being determined by the external device after the predetermined time.

2. The integrated circuit device of claim 1, wherein the integrated circuit device includes a smart card, the smart card supporting the ISO communication mode and the non-communication mode, and a version of the ISO communication mode is an ISO-7816 communication mode.

3. The integrated circuit of claim 1, wherein the means is disabled after a predetermined communication mode is set.

4. An integrated circuit device having an ISO communication mode and a non-ISO communication mode, the integrated circuit device comprising:
   first and second data lines;
   a transceiver circuit coupled to the first and second data lines; and
   a voltage control circuit for determining whether or not an external device is electrically connected to the integrated circuit device in response to a voltage level on at least one data line at a power-up state, and controlling a voltage of the first data line according to the determination result,
   wherein, when the external device is electrically connected to the integrated circuit device, the voltage control circuit is set to any one of the ISO communication mode and the non-ISO communication mode within a predetermined time according to the voltage level, the voltage control circuit controls the voltage of the first data line so as to cause the external device not to recognize the integrated circuit device for a the predetermined time, and after the predetermined time, the voltage control circuit controls the voltage of the first data line so as to cause the external device to recognize the integrated circuit device;
   wherein the voltage control circuit controls a voltage of the second data line to be equal to that of the first data line for the predetermined time, the voltage of the second data line being determined by the external device after the predetermined time.

5. The integrated circuit device of claim 4, wherein the integrated circuit device is set to any one of the communication modes according to the determination result.

6. The integrated circuit device of claim 4, wherein the voltage control circuit controls the voltage of the first data line to be lower than a predetermined reference voltage for the predetermined time, so that the external device does not recognize the integrated circuit device.

7. The integrated circuit device of claim 4, wherein the voltage control circuit increases the voltage of the first data line after the predetermined time so as to cause the external device to recognize the integrated circuit device as a low or high speed device.

8. The integrated circuit device of claim 1, wherein the integrated circuit device includes a smart card supporting the ISO communication mode and the non-ISO communication mode, and the external device includes a smart card reader, and a version of the ISO communication mode is an ISO-7816 communication mode.

9. An integrated circuit device an ISO communication mode and a non-ISO communication mode, the integrated circuit device comprising:
   first and second data lines;
   a transceiver circuit coupled to the first and second data lines;
   a first pull-up circuit coupled to the first data line;
   a second pull-up circuit coupled to the second data line; and
   a control circuit responsive to voltages of the first and second data lines, for detecting whether or not an external device is electrically connected to the integrated circuit device,
   wherein, when the external device is electrically connected to the integrated circuit device, the control circuit is set to any one of the ISO communication mode and the non-ISO communication mode within a predetermined time according to the voltages of the first and second data lines, the control circuit controls the first and second pull-up circuits so as to cause the external device to not recognize the integrated circuit device for a predetermined time, and after the predetermined time, the control circuit controls the first and second pull-up circuits so as to cause the external device to recognize the integrated circuit device;
   wherein the voltage control circuit controls a voltage of the second data line to be equal to that of the first data line for the predetermined time, the voltage of the second data line being determined by the external device after the predetermined time.

10. The integrated circuit device of claim 9, wherein the integrated circuit device is set to any one of the communication modes within the predetermined time according to the detection result.

11. The integrated circuit device of claim 9, wherein the control circuit varies a resistance of the first pull-up circuit after the predetermined time and simultaneously isolates electrically the second pull-up circuit from the second data line.

12. The integrated circuit device of claim 11, wherein the resistance of the first pull-up circuit is varied to 1.5 k.Ohm, after the predetermined time so as to cause the external device to recognize the integrated circuit device.

13. The integrated circuit device of claim 9, wherein the first and second pull-up circuits have the same resistance for the predetermined time.

14. The integrated circuit device of claim 9, wherein the control circuit is disabled after the external device recognizes the integrated circuit device.

15. The integrated circuit device of claim 9, wherein the integrated circuit device includes a smart card supporting the ISO communication mode and the non-ISO communication mode, and the external device includes a smart card reader, and a version of the ISO communication mode is an ISO-7816 communication mode.

16. A method for operating an integrated circuit device, the integrated circuit device including an ISO communication mode and a non-ISO communication mode and communicating with an external device in any one of the ISO and non-ISO communication modes, the method comprising the steps of:
   determining whether or not the integrated circuit device is electrically connected to the external device in response to a voltage level on at least one data line;
   when the integrated circuit device is electrically connected to the external circuit, selecting any one of the modes the ISO communication mode and the non-ISO communication mode according to the voltage level; and
   indicating to the external device that the integrated circuit device is electrically connected to the external device,
   wherein, during the selecting any one of the communication modes, the integrated circuit device causes the external device not to recognize the integrated circuit device, and after the selecting, the integrated circuit device causes the external device to recognize the integrated circuit device;
   wherein the integrated circuit device comprises a first data line and a second data line;
   wherein the voltage control circuit controls a voltage of the second data line to be equal to that of the first data line for the predetermined time, the voltage of the second data line being determined by the external device after the predetermined time.

17. The method of claim 16, wherein the integrated circuit device includes a smart card and the external device includes a smart card reader.

18. The method of claim 16, wherein the step of determining whether or not the integrated circuit device is electrically connected to the external device is performed by using voltages of data terminals of the integrated circuit device.

19. A method for operating an integrated circuit device, the integrated circuit device including an ISO communication mode and a non-ISO communication mode and communicating with an external device in any one of the ISO communication mode and non-ISO communication mode, the method comprising the steps of:
   determining whether or not the external device is electrically connected to the integrated circuit device in response to a voltage level on at least one data line;
   when the external device is electrically connected to the integrated circuit device, causing the external device to not recognize the integrated circuit device for a predetermined time; and
   causing the external device to recognize the integrated circuit device after the predetermined time;
   wherein the integrated circuit device comprises a first data line and a second data line;
   wherein the voltage control circuit controls a voltage of the second data line to be equal to that of the first data line for the predetermined time, the voltage of the second data line being determined by the external device after the predetermined time.

20. The method of claim 19, wherein the integrated circuit device includes a smart card.

21. The method of claim 19, wherein the step of determining whether or not the external device is electrically connected to the integrated circuit device is performed by using voltages of data terminals of the integrated circuit device.

22. The method of claim 19, wherein, while the external device does not recognize the integrated circuit device, any one of the ISO communication mode and non-ISO communication mode is selected.

* * * * *